United States Patent
Leeson et al.

(10) Patent No.: US 12,085,765 B2
(45) Date of Patent: Sep. 10, 2024

(54) PUSHABLE MPO CONNECTOR

(71) Applicant: PPC BROADBAND FIBER LTD., Woodbridge (GB)

(72) Inventors: Kim Leeson, Ipswich (GB); Harvey Etheridge, Norfolk (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 17/567,877

(22) Filed: Jan. 3, 2022

(65) Prior Publication Data

US 2022/0206228 A1    Jun. 30, 2022

Related U.S. Application Data

(60) Provisional application No. 63/133,039, filed on Dec. 31, 2020.

(51) Int. Cl.
*G02B 6/38*    (2006.01)

(52) U.S. Cl.
CPC .......... *G02B 6/3825* (2013.01); *G02B 6/3821* (2013.01); *G02B 6/3857* (2013.01); *G02B 6/387* (2013.01); *G02B 6/3885* (2013.01)

(58) Field of Classification Search
CPC ..... G02B 6/3821; G02B 6/3857; G02B 6/387
See application file for complete search history.

(56) References Cited

U.S. PATENT DOCUMENTS 8,757,894 B2     6/2014    Katoh
9,383,539 B2 *   7/2016    Hill ...................... G02B 6/3882

FOREIGN PATENT DOCUMENTS

EP      1020745 A2     7/2000
EP      3201668 A1     8/2017
WO      2016053853 A1  4/2016

OTHER PUBLICATIONS

International Search Report dated Apr. 7, 2022 in corresponding International Application No. PCT/US2022/011059, 4 pages.

(Continued)

*Primary Examiner* — Sung H Pak
(74) *Attorney, Agent, or Firm* — MH2 TECHNOLOGY LAW GROUP LLP

(57) ABSTRACT

A fiber optic connector includes a ferrule, a ferrule adapter configured to be coupled with the ferrule, and a retention body configured to be coupled with a multi-fiber cable. The ferrule is configured to terminate a plurality of fibers of a multi-fiber cable and is configured with a cross-sectional profile smaller than a ferrule of a multi-fiber push on (MPO) connector such that the ferrule is configured to be pushed through a duct having an inside diameter smaller than a cross-sectional profile of the ferrule of the MPO connector. The ferrule adapter and the ferrule cooperate to define a ferrule interface configured to mate with ferrule of the MPO connector. The ferrule is configured to include external channels at opposing laterals sides of the ferrule. The ferrule adapter is configured to include channels that oppose the external channels of the ferrule. The channels of the ferrule adapter and the external channels of the ferrule are configured to cooperate to define a pair of bores configured to receive a pair of external pins. The bores are configured to receive a pair of pins from the mating MPO connector.

41 Claims, 12 Drawing Sheets

(56) References Cited

OTHER PUBLICATIONS

Written Opinion dated Apr. 7, 2022 in corresponding International Application No. PCT/US2022/011059, 8 pages.

\* cited by examiner

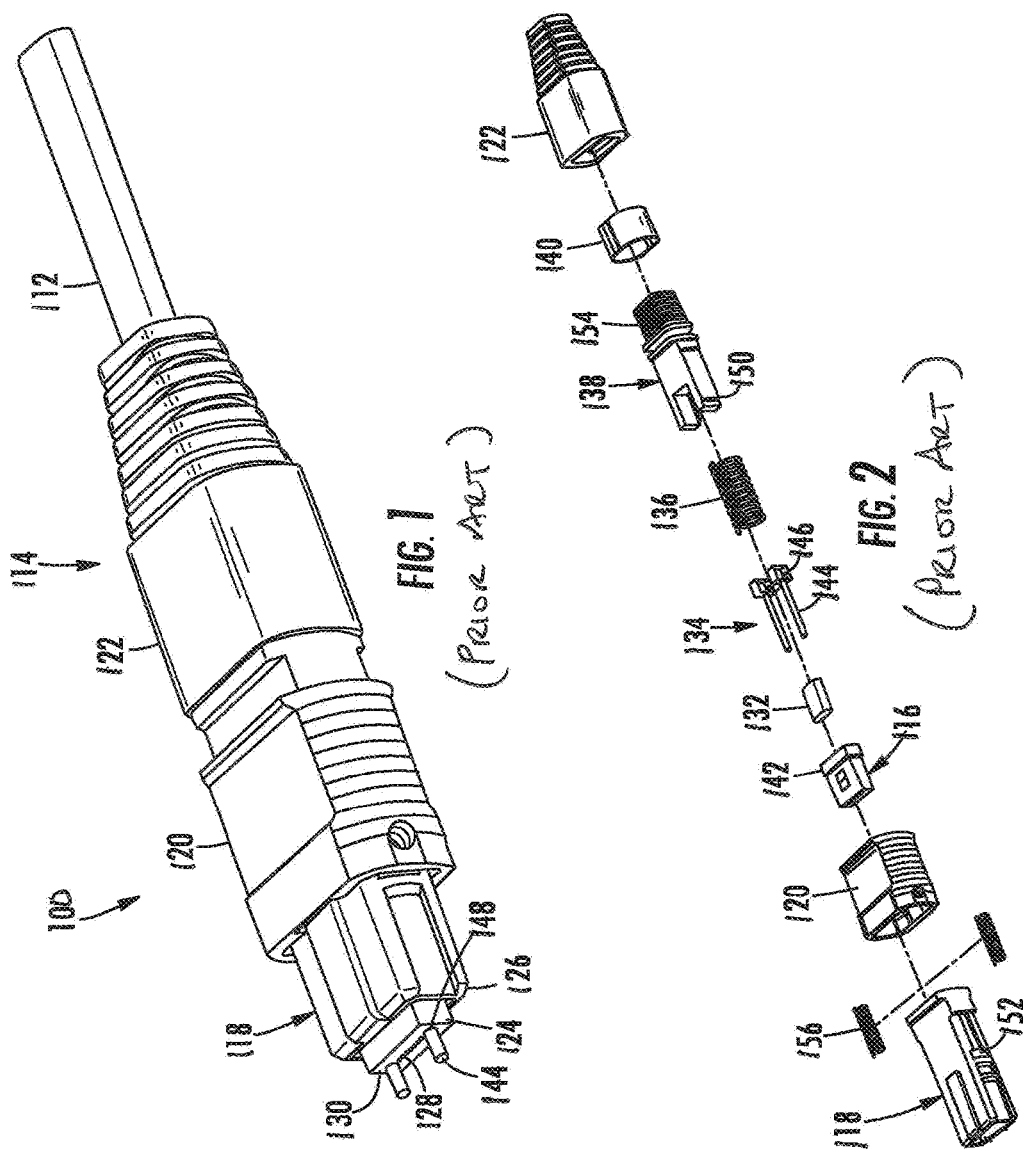

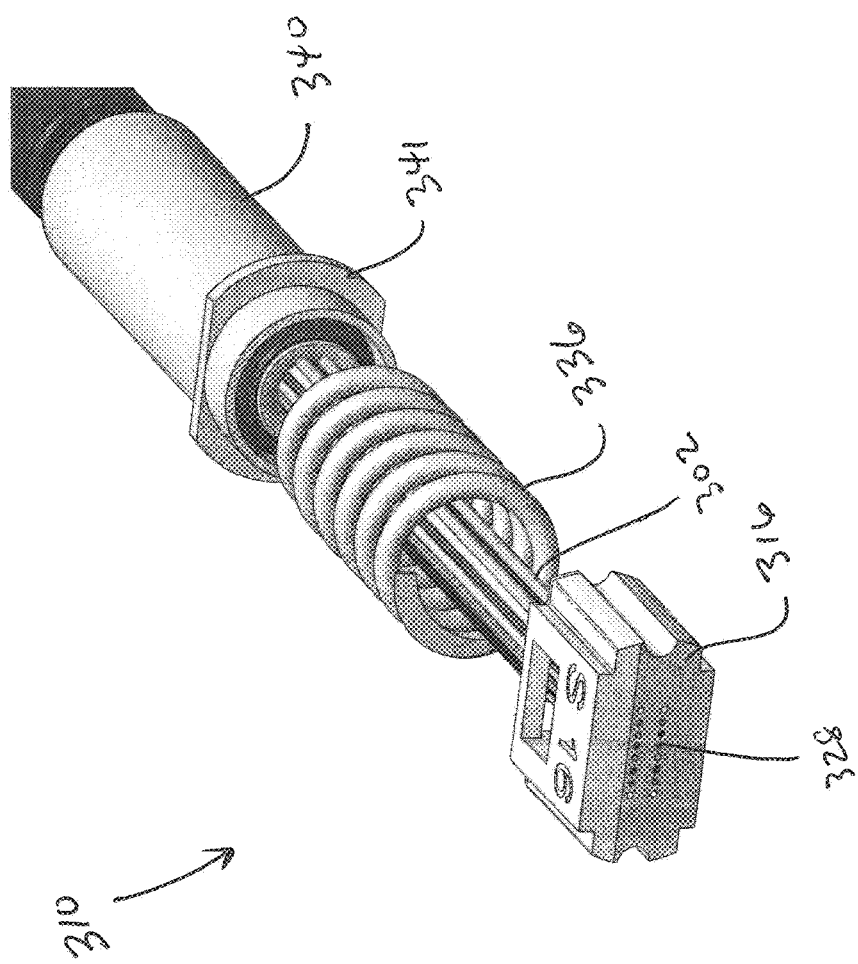

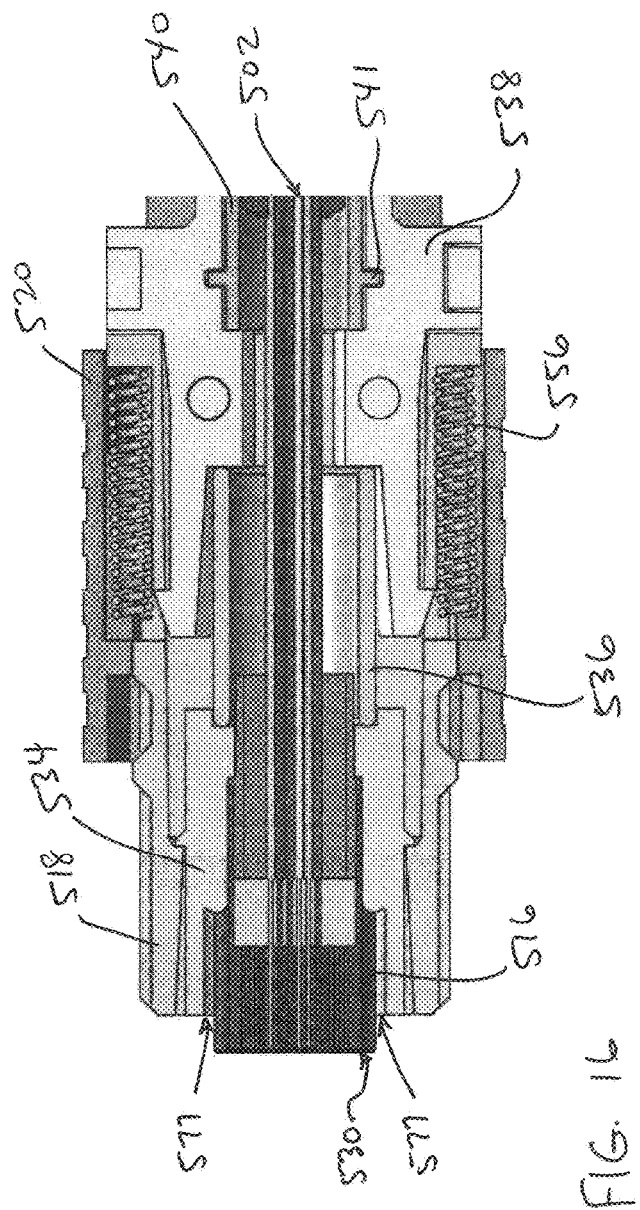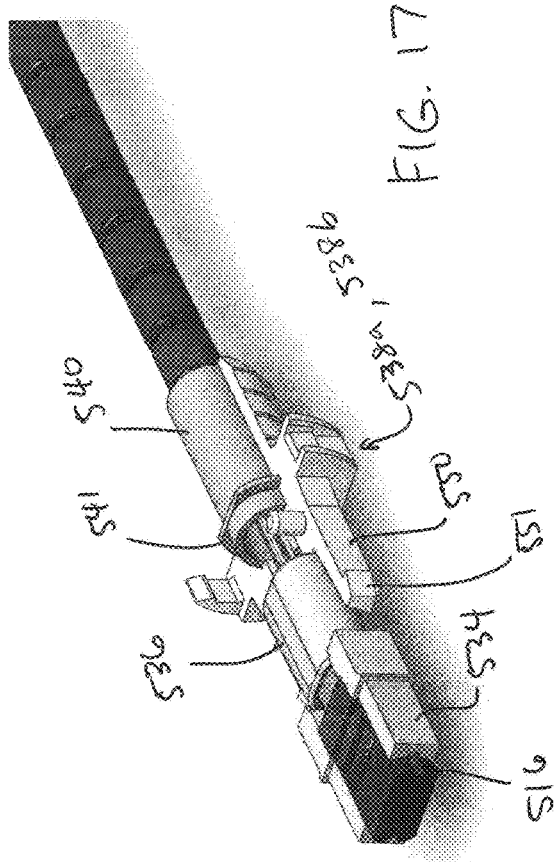

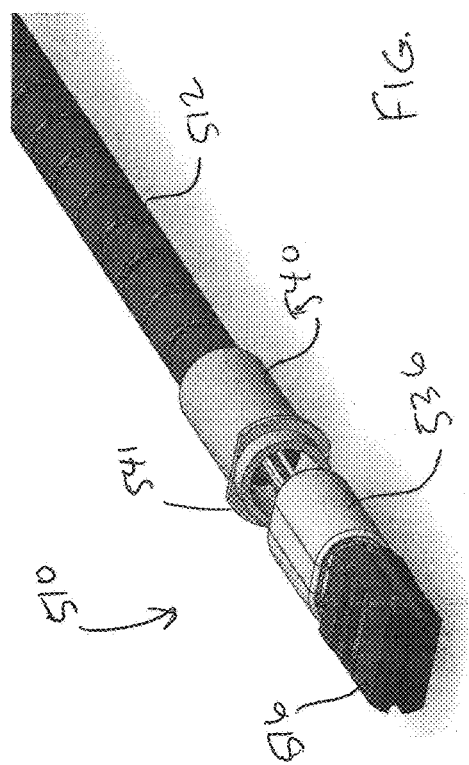
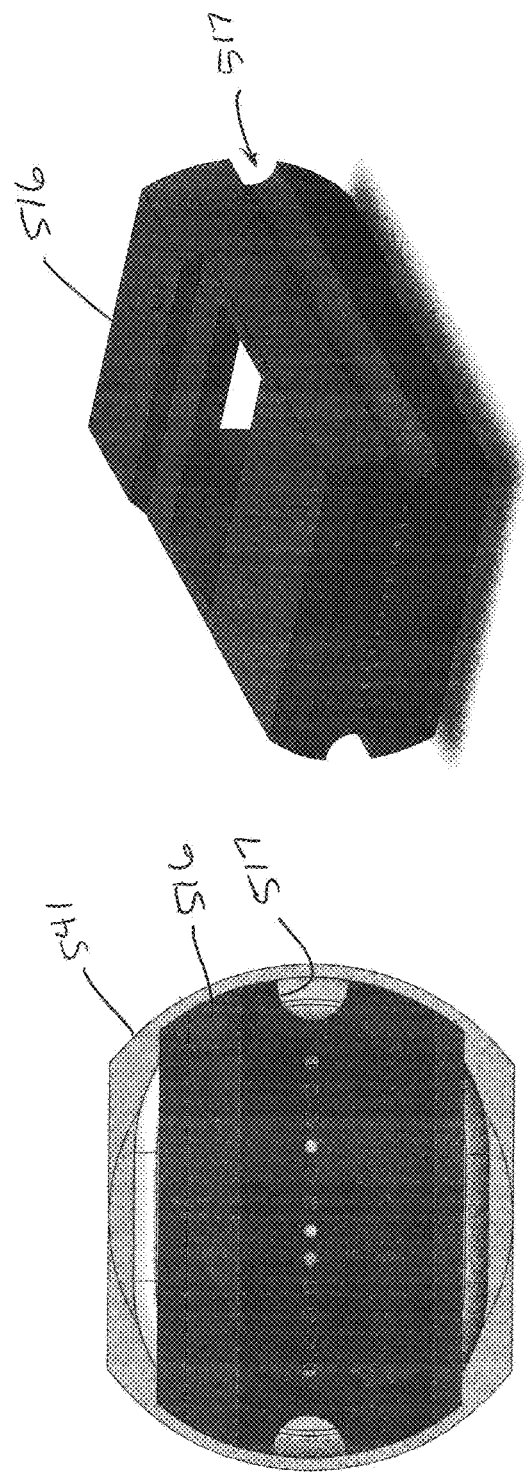

PUSHABLE MPO CONNECTOR

CROSS-REFERENCE TO RELATED APPLICATION

This application claims the benefit of U.S. Provisional Application No. 63/133,039, filed on Dec. 31, 2020. The disclosure of the prior application is hereby incorporated by reference herein in its entirety.

TECHNICAL FIELD

The present disclosure relates to fiber optic connectors and, more particularly, to a ferrule assembly for a pushable multiple fiber push on connector.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, optical connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" connectors).

Many different types of optical connectors exist. In environments that require high density interconnects and/or high bandwidth, such as data centers, multi-fiber optical connectors are the most widely used. One example is the multi-fiber push on (MPO) connector, which incorporates a mechanical transfer (MT) ferrule and standardized according to TOA-604-5 and IEC 61754-7. Another example is the MTP® connector, which is a particular type of MPO connector (MTP® is a trademark of US Conec Ltd.). These connectors can achieve a very high density of optical fibers, which reduces the amount of hardware, space, and effort to establish a large number of interconnects.

However, conventional MPO connectors are too large to be pushed through ducts used in fiber optic cable distributions, for example, ducts having an inside diameter of less than 10 mm and, in some aspects, ducts having an inside diameter of 5.5 mm. Therefore, it may be desirable to provide an MPO connector having a ferrule assembly that can terminate a multiple fiber cable and be pushed through a duct and a housing that can be coupled with the ferrule assembly in the field after the terminated multiple fiber cable is pushed through a duct.

SUMMARY

According to various aspects of the disclosure, a fiber optic connector includes a ferrule; a ferrule adapter configured to be coupled with the ferrule; a pin clip; a crimp sleeve configured to be crimped onto the multi-fiber cable; a retention body configured to be coupled with the crimp sleeve; a spring configured to extend about fibers of the multi-fiber cable; a housing configured to be coupled with the retention body; and a shell configured to be coupled with the housing. The ferrule is configured to terminate a plurality of fibers of a multi-fiber cable, and the ferrule is configured with a cross-sectional profile smaller than a ferrule of a multi-fiber push on (MPO) connector such that the ferrule is configured to be pushed through a duct having an inside diameter smaller than a cross-sectional profile of the ferrule of the MPO connector. The ferrule adapter and the ferrule cooperate to define a ferrule interface configured to mate with ferrule of the MPO connector; the ferrule is configured to include external channels at opposing laterals sides of the ferrule; and the ferrule adapter is configured to include channels that oppose the external channels of the ferrule. The channels of the ferrule adapter and the external channels of the ferrule are configured to cooperate to define a pair of bores configured to receive a pair of external pins; the bores are configured to receive a pair of pins from the mating MPO connector; the pin clip is configured to retain the external pins that extend into the bore; the spring is disposed between the pin clip and the crimp sleeve; the spring is configured to bear against a forward facing surface of the retention body and a rearward facing surface of the pin clip to urge the ferrule in a forward direction; the shell is configured to house a pair of springs bearing against a forward facing surface of the housing and a rearward facing surface of the shell to urge the shell in the forward direction; and the connector is configured to be disconnected from a mating adapter by urging the shell in a rearward direction, thereby transferring such urging force to the housing rather than the cable.

According to various embodiments of the disclosure, a fiber optic connector includes a ferrule; a ferrule adapter configured to be coupled with the ferrule; a crimp sleeve configured to be crimped onto the multi-fiber cable; and a retention body configured to be coupled with the crimp sleeve. The ferrule is configured to terminate a plurality of fibers of a multi-fiber cable, and the ferrule is configured with a cross-sectional profile smaller than a ferrule of a multi-fiber push on (MPO) connector such that the ferrule is configured to be pushed through a duct having an inside diameter smaller than a cross-sectional profile of the ferrule of the MPO connector. The ferrule adapter and the ferrule cooperate to define a ferrule interface configured to mate with ferrule of the MPO connector; the ferrule is configured to include external channels at opposing laterals sides of the ferrule; and the ferrule adapter is configured to include channels that oppose the external channels of the ferrule. The channels of the ferrule adapter and the external channels of the ferrule are configured to cooperate to define a pair of bores configured to receive a pair of external pins; the bores are configured to receive a pair of pins from the mating MPO connector; and a spring is configured to urge the ferrule in a forward direction.

In some aspects, the fiber optic connector further includes a housing configured to be coupled with the retention body and a shell configured to be coupled with the housing; wherein the shell is configured to house a pair of springs bearing against a forward facing surface of the housing and a rearward facing surface of the shell to urge the shell in the forward direction.

In some aspects, the connector is configured to be disconnected from a mating adapter by urging the shell in a rearward direction, thereby transferring such urging force to the housing rather than the cable.

In some aspects, the retention body includes two retention body halves configured to be coupled with one another.

In some aspects, the spring is configured to extend about fibers of the multi-fiber cable.

In some aspects, the spring is configured to be compressed between a forward facing surface of the retention body and a rearward facing surface of the ferrule adapter.

In some aspects a pin clip is configured to retain the external pins that extend into the bore According to various exemplary embodiments, a fiber optic connector includes a ferrule, a ferrule adapter configured to be coupled with the ferrule, and a retention body configured to be coupled with a multi-fiber cable. The ferrule is configured to terminate a plurality of fibers of a multi-fiber cable and is configured with a cross-sectional profile smaller than a ferrule of a multi-fiber push on (MPO) connector such that the ferrule is configured to be pushed through a duct having an inside diameter smaller than a cross-sectional profile of the ferrule of the MPO connector. The ferrule adapter and the ferrule cooperate to define a ferrule interface configured to mate with ferrule of the MPO connector. The ferrule is configured to include external channels at opposing laterals sides of the ferrule. The ferrule adapter is configured to include channels that oppose the external channels of the ferrule. The channels of the ferrule adapter and the external channels of the ferrule are configured to cooperate to define a pair of bores configured to receive a pair of external pins. The bores are configured to receive a pair of pins from the mating MPO connector.

In some aspects, the fiber optic connector further includes a housing configured to be coupled with the retention body and a shell configured to be coupled with the housing; wherein the shell is configured to house a pair of springs bearing against a forward facing surface of the housing and a rearward facing surface of the shell to urge the shell in the forward direction.

In some aspects, the connector is configured to be disconnected from a mating adapter by urging the shell in a rearward direction, thereby transferring such urging force to the housing rather than the cable.

In some aspects, the retention body includes two retention body halves configured to be coupled with one another.

In some aspects, the spring is configured to extend about fibers of the multi-fiber cable.

In some aspects, the spring is configured to be compressed between a forward facing surface of the retention body and a rearward facing surface of the ferrule adapter.

In some aspects a pin clip is configured to retain the external pins that extend into the bore.

The foregoing and other features of construction and operation of the invention will be more readily understood and fully appreciated from the following detailed disclosure, taken in conjunction with accompanying drawings.

BRIEF DESCRIPTION OF THE DRAWINGS

FIG. 1 is a perspective view of a conventional a fiber optic connector;

FIG. 2 is an exploded perspective view of the conventional fiber optic connector of FIG. 1;

FIG. 8 is a perspective view of the ferrule assembly of the fiber optic connector of FIG. 3;

FIG. 16 is an enlarged top cross-sectional view of a portion of the fiber optic connector of FIG. 14;

FIG. 17 is a perspective view of the ferrule assembly, housing, and retaining clip of the fiber optic connector of FIG. 14;

FIG. 18 is a perspective view of the ferrule assembly of the fiber optic connector of FIG. 14;

FIG. 19 is a front view of the ferrule assembly of FIG. 18;

FIG. 20 is a perspective view of the ferrule of the fiber optic connector of FIG. 14.

DETAILED DESCRIPTION OF EMBODIMENTS

Figure 3:
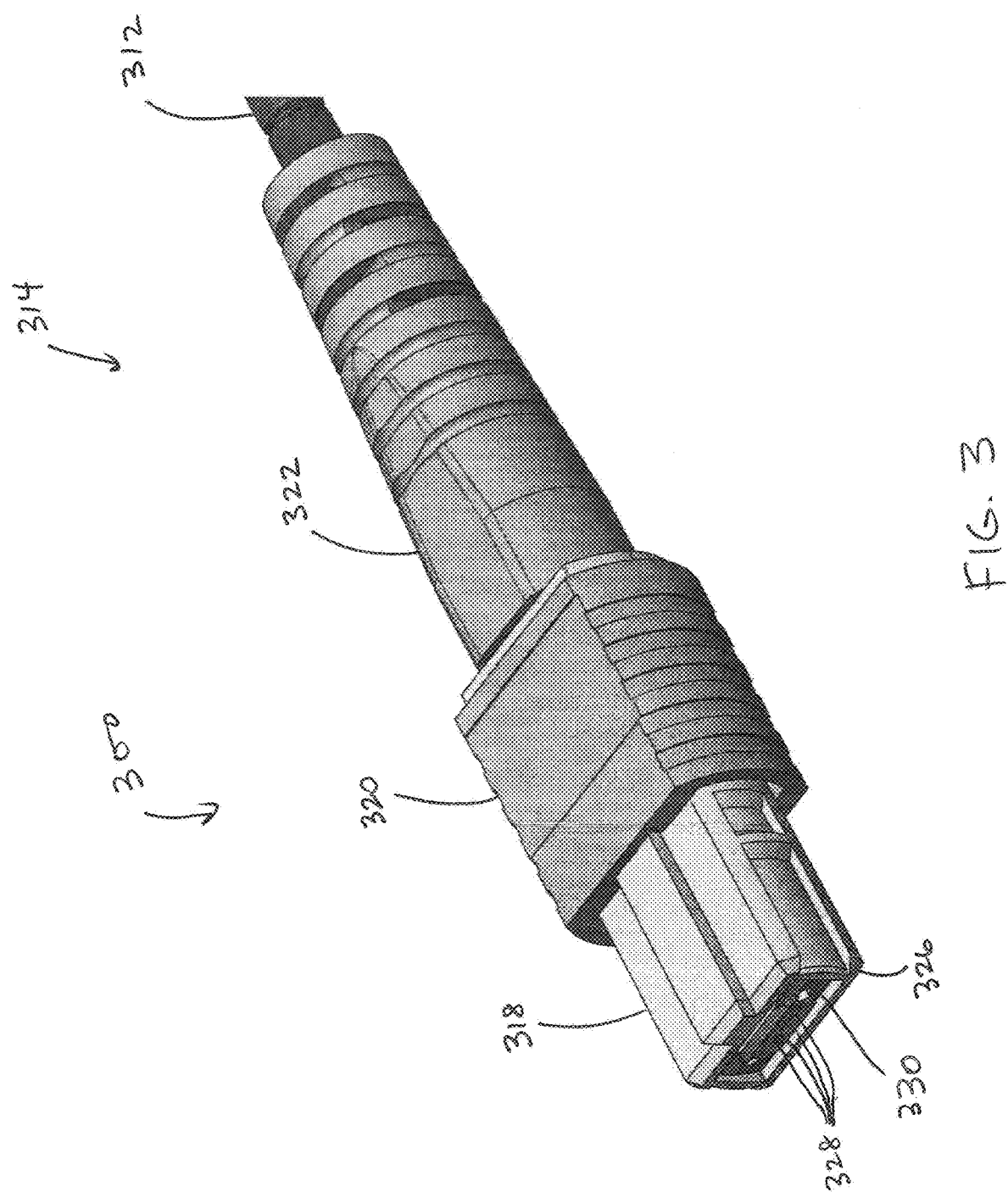
FIG. 3 is a perspective view of an exemplary fiber optic connector in accordance with various aspects of the disclosure.
Figure 4:
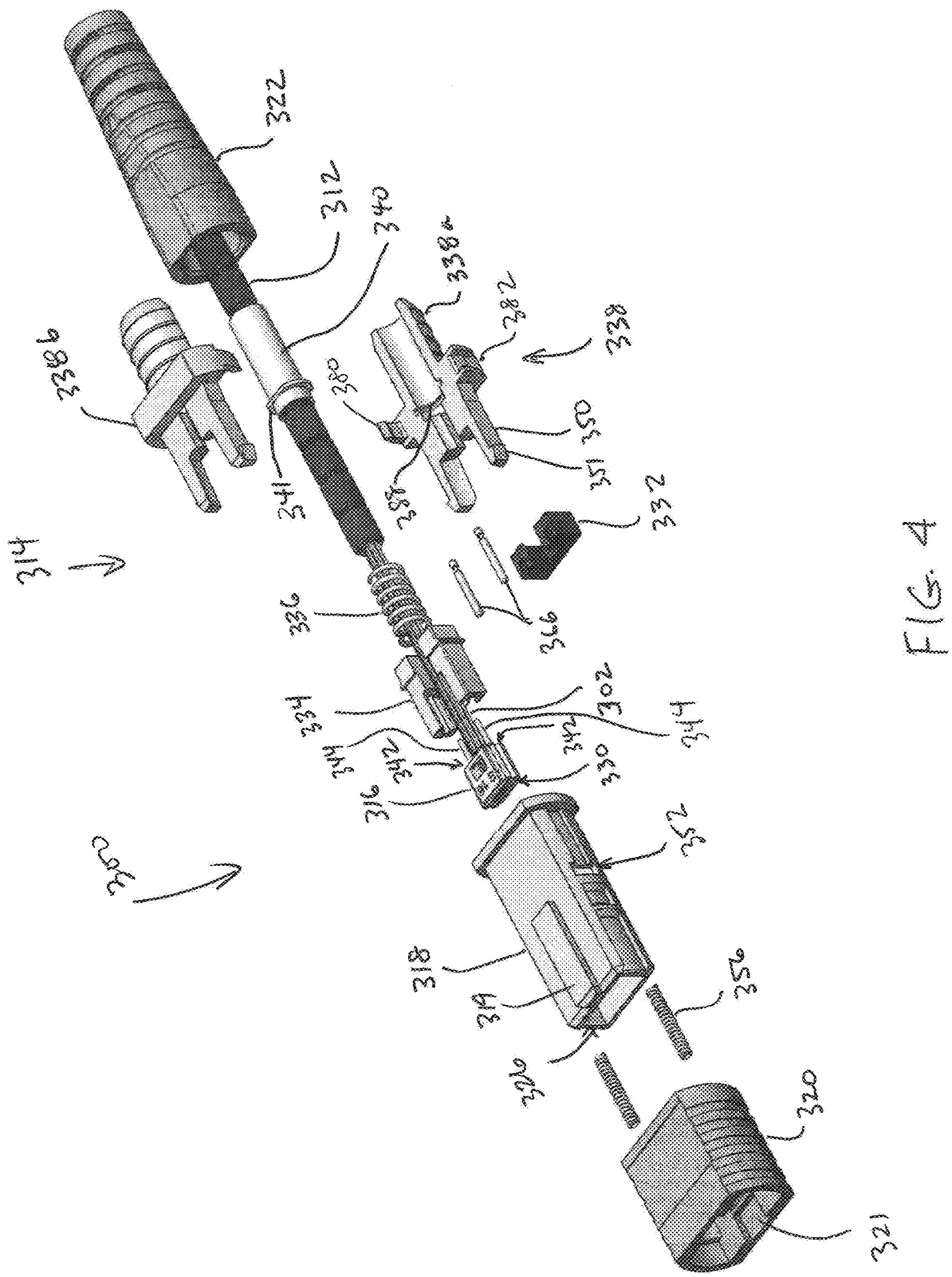
FIG. 4 is an exploded perspective view of the fiber optic connector of FIG. 3.

As a preface to the detailed description, it should be noted that, as used in this specification and the appended claims, the singular forms "a", "an" and "the" include plural referents, unless the context clearly dictates otherwise.

FIGS. 1 and 2 illustrate a conventional fiber optic connector 100 (also referred to as an "optical connector" or simply "connector") in the form of an MTP® connector, which is a particular type of MPO connector (MTP® is a trademark of US Conec Ltd.).

As shown in FIG. 1, the connector 100 may be installed on a fiber optic cable 112 ("cable") to form a fiber optic cable assembly 114. The connector includes a ferrule 116, a housing 118 received over the ferrule 116, a slider 120 received over the housing 118, and a boot 122 received over the cable 112. The ferrule 116 is spring-biased within the housing 118 so that a front portion 124 of the ferrule 116 extends beyond a front end 126 of the housing 118. Optical fibers (not shown) carried by the cable 112 extend through bores/micro-holes 128 in the ferrule 116 before terminating at or near an end face 130 of the ferrule 116. The optical fibers are secured within the ferrule 116 using an adhesive material (e.g., epoxy) and can be presented for optical coupling with optical fibers of a mating component (e.g., another fiber optic connector; not shown) when the housing 120 is inserted into an adapter, receptacle, or the like.

As shown in FIG. 2, the connector 100 also includes a ferrule boot 132, a guide pin assembly 134, a spring 136, a retention body 138 (also referred to as a crimp body), and a crimp ring 140. The ferrule boot 132 is received in a rear portion 142 of the ferrule 116 to help support the optical fibers extending to the ferrule bores 128 (FIG. 1). The guide pin assembly 134 includes a pair of guide pins 144 extending from a pin keeper 146. Features on the pin keeper 146 cooperate with features on the guide pins 144 to retain portions of the guide pins 144 within the pin keeper 146. When the connector 100 is assembled, the pin keeper 146 is positioned against a back surface of the ferrule 116, and the guide pins 144 extend through pin holes 148 (FIG. 1) provided in the ferrule 116 so as to project beyond the front end face 130.

Both the ferrule 116 and guide pin assembly 134 are biased to a forward position relative to the housing 118 by the spring 136. More specifically, the spring 136 is positioned between the pin keeper 146 and a portion of the crimp body 138. The crimp body 138 is inserted into the housing 118 when the connector 100 is assembled and includes latching arms 150 that engage recesses 152 in the housing 118. The spring 136 is compressed by this point and exerts a biasing force on the ferrule 116 via the pin keeper 146. The rear portion 142 of the ferrule defines a flange that interacts with a shoulder or stop formed within the housing 118 to retain the rear portion 142 within the housing 118.

In a manner not shown in the figures, aramid yarn or other strength members from the cable 112 are positioned over an end portion 154 of the crimp body 138 that projects rearwardly from the housing 118. The aramid yarn is secured to the end portion 154 by the crimp ring 140, which is slid over the end portion 154 and deformed after positioning the aramid yarn. The boot 122 covers this region, as shown in FIG. 1, and provides strain relief for the optical fibers by limiting the extent to which the connector 100 can bend relative to the cable 112. To insert the connector into an adapter or receptacle, the connector 100 is configured such that a user grasps the boot 122 and pushes the connector 100 into the adapter or receptacle, thereby allowing the housing to be fully inserted for proper engagement/mating with the adapter or receptacle. To disengage the connector 100 from an adapter or receptacle, the user grasps and pulls the slider 120, which may be biased by springs 156 (FIG. 2) relative to the housing 118, away from the adapter or receptacle. This way pull forces are transferred directly to the housing 118 (rather than the cable 112) to disengage the housing 118 from the adapter or receptacle.

Referring now to FIGS. 3-13, an exemplary fiber optic connector 300 in accordance with various aspects of the disclosure is illustrated and described. The fiber optic connector 300 is in the form of an MPO connector. As shown in FIGS. 3-7, the connector 300 may be installed on a fiber optic cable 312 ("cable") to form a fiber optic cable assembly 314. The connector includes a ferrule 316 (e.g., a mechanical transfer (MT) ferrule), a housing 318 received over the ferrule 316, a shell 320 received over the housing 318, and a boot 322 received over the cable 312. The ferrule 316 is spring-biased within the housing 318 toward a front end 326 of the housing 318. Optical fibers 302 carried by the cable 312 extend through bores/micro-holes 328 in the ferrule 316 before terminating at or near an end face 330 of the ferrule 316. The optical fibers 302 may be secured within the ferrule 316 using an adhesive material (e.g., epoxy) and can be presented for optical coupling with optical fibers of a mating component (e.g., another fiber optic connector; not shown) when the housing 318 is inserted into an adapter, receptacle, or the like.

Although the drawings illustrate the ferrule 316 terminating six fibers of the multiple fiber cable 312, it should be appreciated that the ferrule 316 can be configured to terminate less than six fibers or more than six fibers of a multiple fiber cable. For example, in some aspects, the ferrule 316 may be configured to terminate twelve fibers of a multiple fiber cable.

Figure 5:
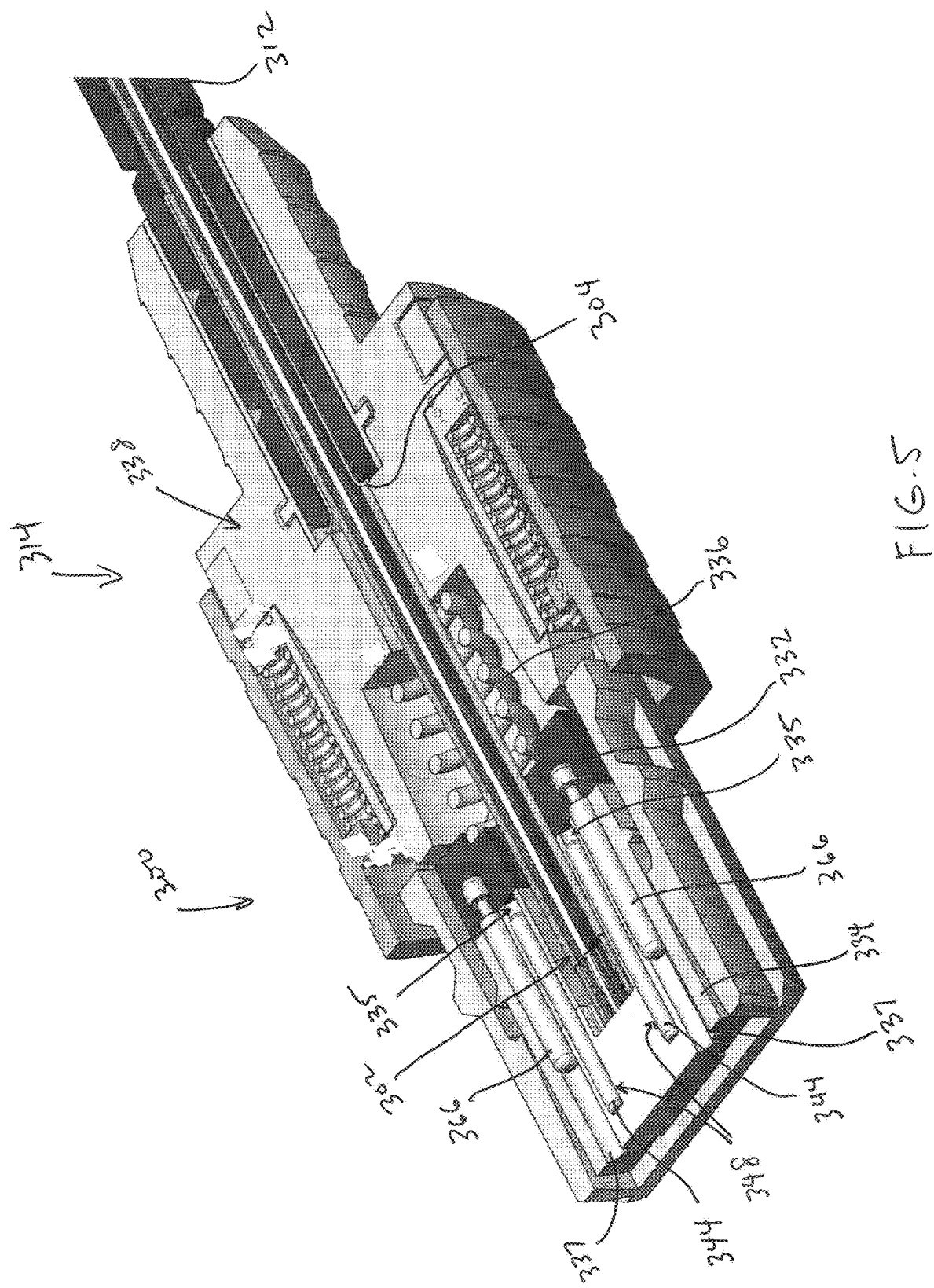
FIG. 5 is a perspective cross-sectional view of the fiber optic connector of FIG. 3.
Figure 6:
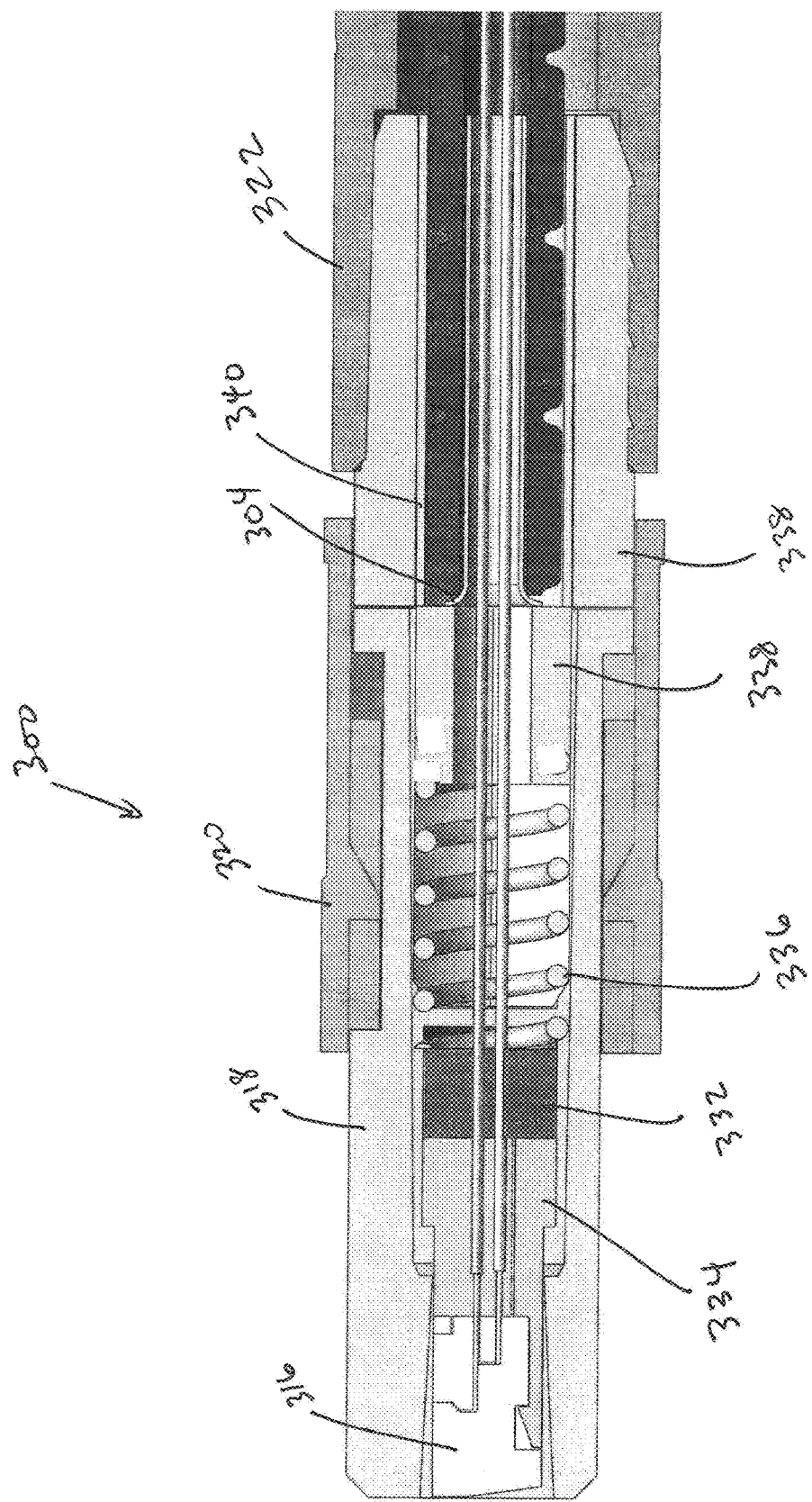
FIG. 6 is a side cross-sectional view of the fiber optic connector of FIG. 3.
Figure 7:
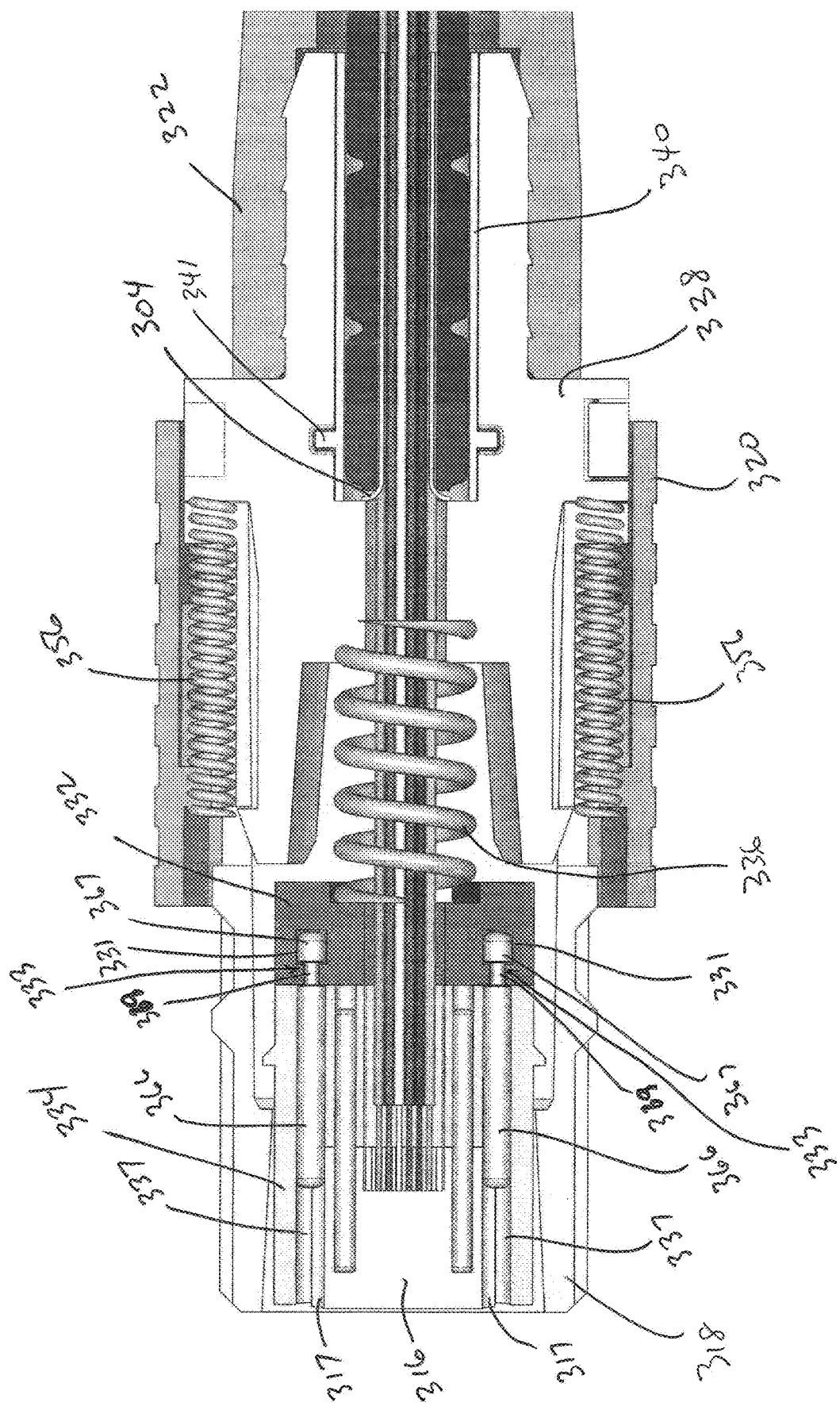
FIG. 7 is a top cross-sectional view of the fiber optic connector of FIG. 3.

The connector 300 also includes a pin clip 332, a ferrule adapter 334, a spring 336 (e.g., an oval spring), a retention body 338, and a crimp sleeve 340. As shown in FIGS. 5-7, when the connector 300 is assembled, the pin clip 332 is disposed at a rear end 342 (e.g., against a back surface) of the ferrule 316 to help support the optical fibers extending to the ferrule bores 328. The ferrule adapter 334 includes a pair of bores 335 configured to receive internal pins 344 extending from the ferrule 316 and a pair of channels 337 configured to receive external pins 366 extending from the pin clip 332. In some aspects, the bores 335 can be through bores. The pin clip 332 includes enlarged bore portions 331 configured to receive head portions 367 of the external pins 366 and narrowed neck portions 333 configured to cooperate with neck portions 369 and the head portions 367 of the external pins 366 to retain the head portions 367 of the external pins 366 within the pin clip 332. A portion 370 of each external pin 366 extending from the neck portion 369 is received in a respective one of the channels 337 of the ferrule adapter 334 and an external channel 317 of the ferrule 316. That is, each channel 337 of the ferrule adapter 334 and a respective one of the external channels 317 of the ferrule 316 cooperate to define a bore configured to receive the external pin 366. When the connector 300 is assembled, the internal pins 344 extend into bores 348 provided in the ferrule 316.

The ferrule 316, the ferrule adapter 334, and the pin clip 332 are biased to a forward position relative to the housing 318 by the spring 336. More specifically, the spring 336 is positioned between a rear facing surface of the pin clip 332 and a forward facing surface of the retention body 338. The retention body 338 includes two body halves 338a, 338b that have the same construction, including a latch member 380 and a catch 382 disposed on opposite lateral sides of the body halves 338a, 338b. Each of the body halves 338a, 338b also includes a pair of forward extending latching arms 350, and the latching arms 350 include outward extending protrusions 351 configured to engage a notch, recess, or opening 352 in a side wall of the housing 318 to couple the retention body 338 with the housing 318. Each of the body halves 338a, 338b may also include a circumferentially-extending groove 388 configured to receive a circumferential flange 341 extending radially outward from an outer surface of the crimp sleeve 340. The flange 341 may include one more flattened portions that prevent rotation of the crimp sleeve 340, and thus the cable 312 and fibers 302, relative to the retention body 338. Of course, alternative keying structures may be employed in place of the flattened portions. An inner support sleeve 304 may be inserted beneath the jacket of the cable 312 to protect the fibers 302 when the crimp sleeve 340 is crimped to the cable 312.

The retention body 338 is inserted into the housing 318 when the connector 300 is assembled, and the protrusions 351 of the latching arms 350 engage openings 352 in the side wall of the housing 318. The spring 336 is compressed by this point and exerts a biasing force on the ferrule 316 via the pin clip 332 and the ferrule adapter 334. The ferrule adapter 334 includes a flange configured to interact with a shoulder or stop formed within the housing 318 to retain the ferrule 316 and the ferrule adapter 334 within the housing 318. The boot 322 covers a rear portion of the retention body 338, as shown in FIG. 3, and provides strain relief for the optical fibers 302 by limiting the extent to which the connector 300 can bend relative to the cable 312.

To insert the connector into an adapter or receptacle, the connector 300 is configured such that a user grasps the boot 322 and pushes the connector 300 into the adapter or receptacle. Pins from a mating connector (not shown) at the adapter or receptacle are received in the bores delineated by cooperative alignment of the channels 337 of the ferrule adapter 334 and the external channels 317, thereby allowing the housing to be fully inserted for proper engagement/mating with the adapter or receptacle. To disengage the connector 300 from an adapter or receptacle, the user grasps and pulls the slider 320, which may be biased by springs 356 relative to the housing 318, away from the adapter or receptacle. This way, pull forces are transferred directly to the housing 318 (rather than the cable 312) to disengage the housing 318 from the adapter or receptacle.

Figure 9:
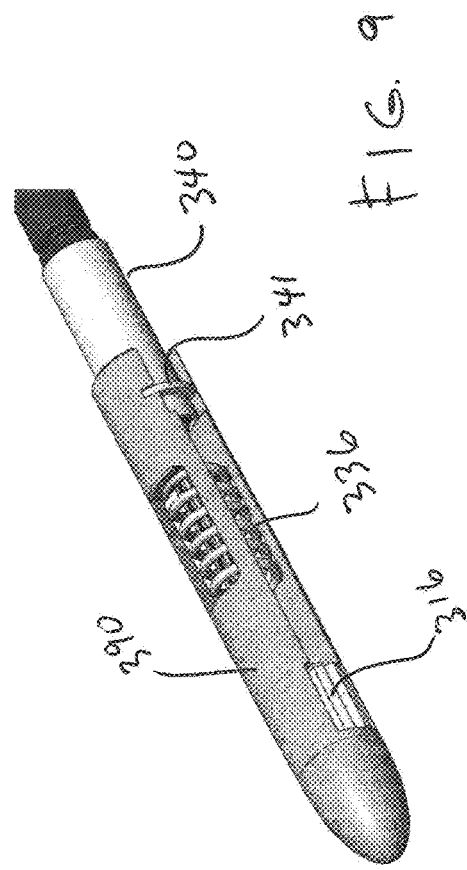
FIG. 9 is a perspective view of the ferrule assembly of FIG. 8 with a protective cap.
Figure 12:
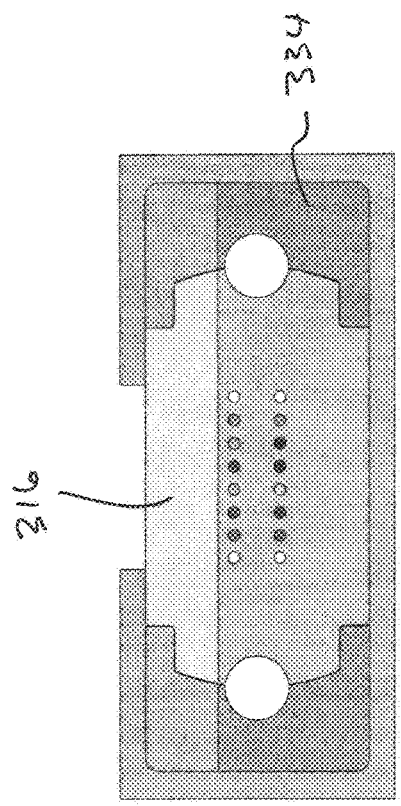
FIG. 12 is a front view of the ferrule and ferrule adapter of FIG. 11.
Figure 13:
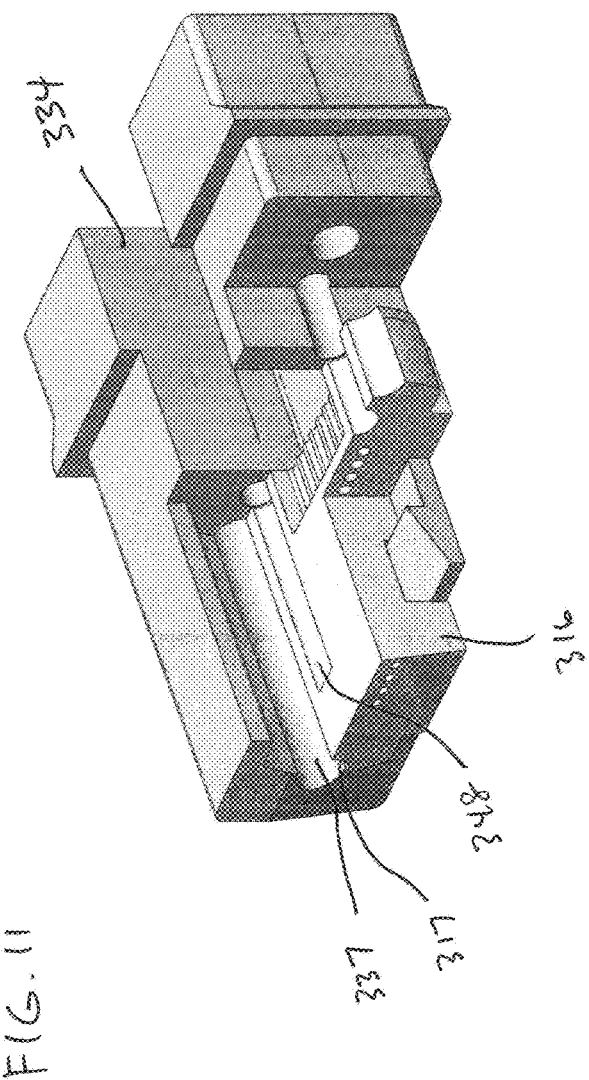
FIG. 13 is a perspective partial cutaway view of the ferrule and ferrule adapter of FIG. 11.
Figure 11:
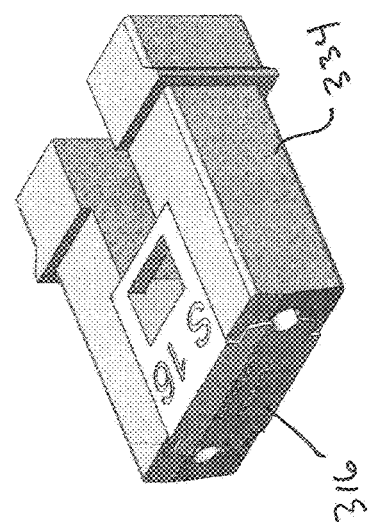
FIG. 11 is a perspective view of the ferrule and ferrule adapter of the fiber optic connector of FIG. 3.

FIG. 8 illustrates a ferrule assembly 310 configured to be pushed through a duct, for example a duct having an inner diameter less than 10 mm and, in some cases, a duct having an inner diameter of 5.5 mm. The ferrule assembly 310 includes the ferrule 316 terminating the plurality of fibers 302, the spring 336, and the crimp sleeve 340. As shown, the inner support sleeve 304 may be disposed beneath the jacket of the cable 312. Referring to FIG. 9, a protective cap 390 may be placed over the ferrule assembly 310 to protect the spring 336 and fibers 302. The cap 390 may include a circumferential groove configured to receive the flange 341 of the crimp sleeve 340 to couple the cap 390 with the crimp sleeve 340. The protective cap 390 can eliminate sharp edges and blunt faces to facilitate pushing through a duct.

Figure 10:
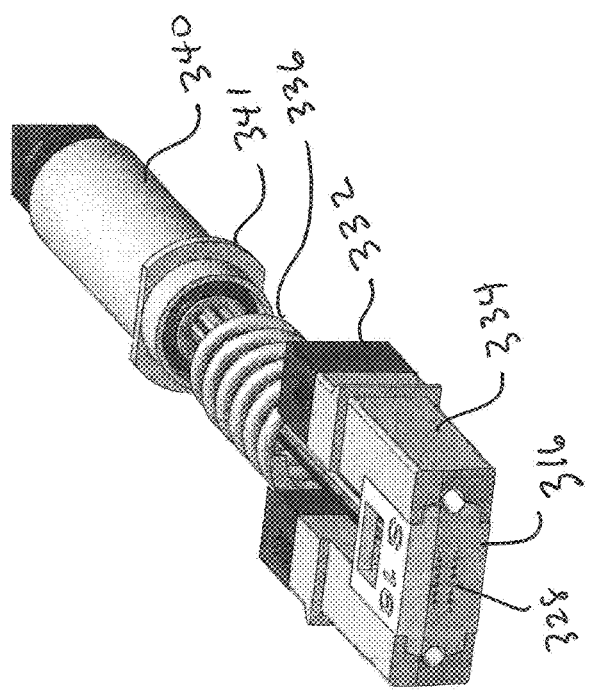
FIG. 10 is a perspective view of the ferrule assembly and housing of the fiber optic connector of FIG. 3.

Referring now to FIG. 10, after the ferrule assembly 310 is pushed through a duct to a connection location of a fiber distribution system, the boot 322 can be moved rearwardly over the ferrule assembly 310 and beyond the crimp sleeve 340. The ferrule adapter 334 and the pin clip 332 can be positioned about the fibers 302 at the rearward end of the ferrule 316, as best shown in FIGS. 5 and 7, and coupled with one another via the internal pins 344 and the external pins 366. The Then, the retention body halves 338a, 338b can be coupled together (e.g., snap-fit together) over the crimp sleeve 340 and spring 336, and the boot 322 can be moved forwardly over the rear portion of the retention body 338. The housing 318 is coupled with the retention body 338 via the cooperating protrusions 351 of the latching arms 350 and the openings 352 in the side walls of the housing 318. The shell springs 356 and shell 320 can then be coupled with the housing 318. The shell 320 may include a recessed portion 321 at a bottom inner surface and/or a top inner surface having a forward facing shoulder configured to engage a rearward facing shoulder of a projection 319 extending from a bottom outer surface and/or a top outer surface of the housing 318.

Referring now to FIGS. 14-20, an exemplary fiber optic connector 500 in accordance with various aspects of the disclosure is illustrated and described. The fiber optic connector 500 is in the form of an MPO connector. The connector 500 is similar to the connector 300 described above, but is slightly modified to eliminate the pin clip 332 and the internal pins 344. In the connector 500, the ferrule 516 and the ferrule adapter 534 cooperate to define pin holes 577 for receiving external pins (not shown).

The connector 500 may be installed on a fiber optic cable 512 ("cable") to form a fiber optic cable assembly 514. The connector includes a ferrule 516 (e.g., a mechanical transfer (MT) ferrule), a housing 518 received over the ferrule 516, a shell 520 received over the housing 518, and a boot 522 received over the cable 512. The ferrule 516 is spring-biased within the housing 518 toward a front end 526 of the housing 518. Optical fibers 502 carried by the cable 512 extend through bores/micro-holes 528 in the ferrule 516 before terminating at or near an end face 530 of the ferrule 516. The optical fibers 502 may be secured within the ferrule 516 using an adhesive material (e.g., epoxy) and can be presented for optical coupling with optical fibers of a mating component (e.g., another fiber optic connector; not shown) when the housing 520 is inserted into an adapter, receptacle, or the like.

Although the drawings illustrate the ferrule 516 terminating twelve fibers of the multiple fiber cable 512, it should be appreciated that the ferrule 516 can be configured to terminate less than twelve fibers or more than twelve fibers of a multiple fiber cable. For example, in some aspects, the ferrule 516 may be configured to terminate twenty-four fibers of a multiple fiber cable.

Figure 15:
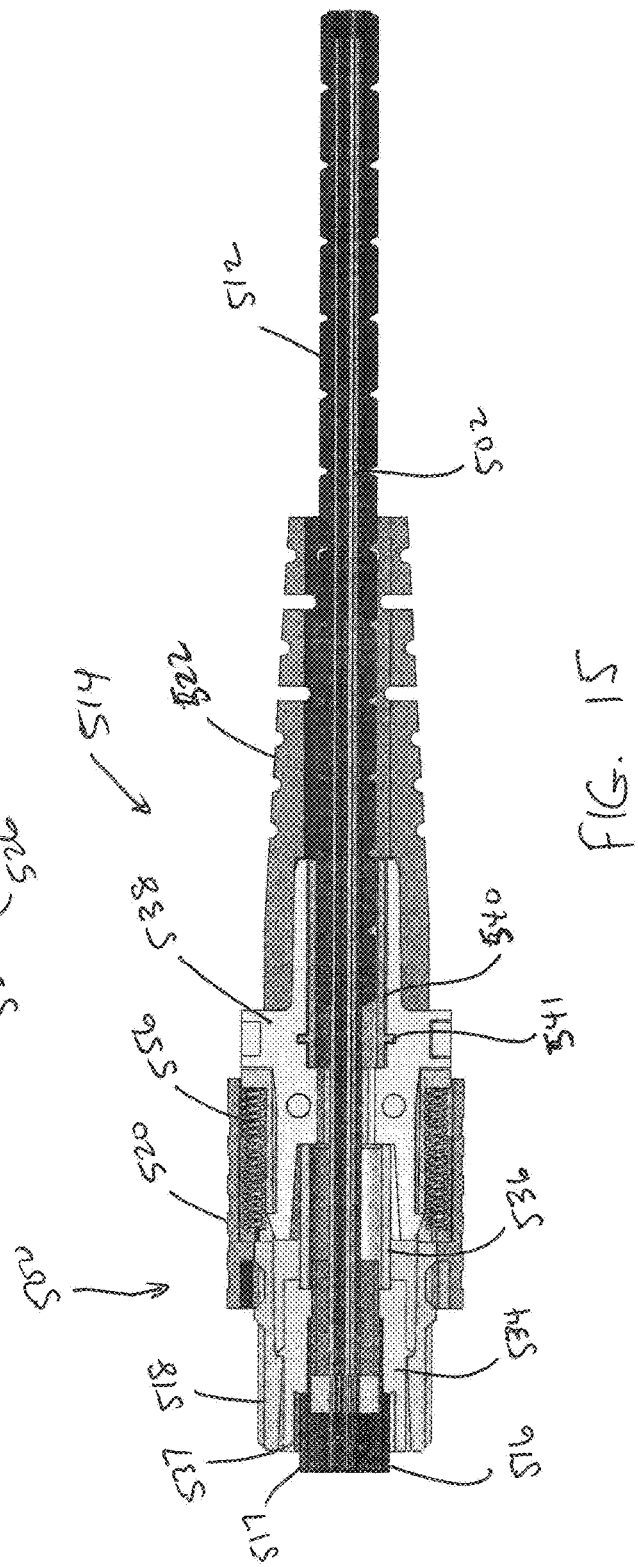
FIG. 15 is a top cross-sectional view of the fiber optic connector of FIG. 14.

The connector 500 also includes a ferrule adapter 534, a spring 536 (e.g., an oval spring), a retention body 538, and a crimp sleeve 540. As best shown in FIGS. 15 and 16, when the connector 500 is assembled, the ferrule adapter 534 is disposed at a rear end 542 (e.g., against a back surface) of the ferrule 516 to help support the optical fibers extending to the ferrule bores 528. The ferrule adapter 534 includes a pair of channels 537 that cooperate with external channels 517 of the ferrule 516 to define the pin holes 577 configured to receive the external pins (not shown).

The ferrule 516 and the ferrule adapter 534 are biased to a forward position relative to the housing 518 by the spring 536. More specifically, the spring 536 is positioned between a rear facing surface of the ferrule adapter 534 and a forward facing surface of the retention body 538. The retention body 538 includes two body halves 538a, 538b that have the same construction, including a latch member 580 and a catch 582 disposed on opposite lateral sides of the body halves 538a, 538b. Each of the body halves 538a, 538b also includes a pair of forward extending latching arms 550, and the latching arms 550 include outward extending protrusions 551 configured to engage a notch, recess, or opening 552 in a side wall of the housing 518 to couple the retention body 538 with the housing 518. Each of the body halves 538a, 538b may also include a circumferentially-extending groove 588 configured to receive a circumferential flange 541 extending radially outward from an outer surface of the crimp sleeve 540. The flange 541 may include one more flattened portions that prevent rotation of the crimp sleeve 540, and thus the cable 512 and fibers 502, relative to the retention body 538. Of course, alternative keying structures may be employed in place of the flattened portions. In some aspects, an inner support sleeve may be inserted beneath the jacket of the cable 512 to protect the fibers 502 when the crimp sleeve 540 is crimped to the cable 512.

Figure 14:
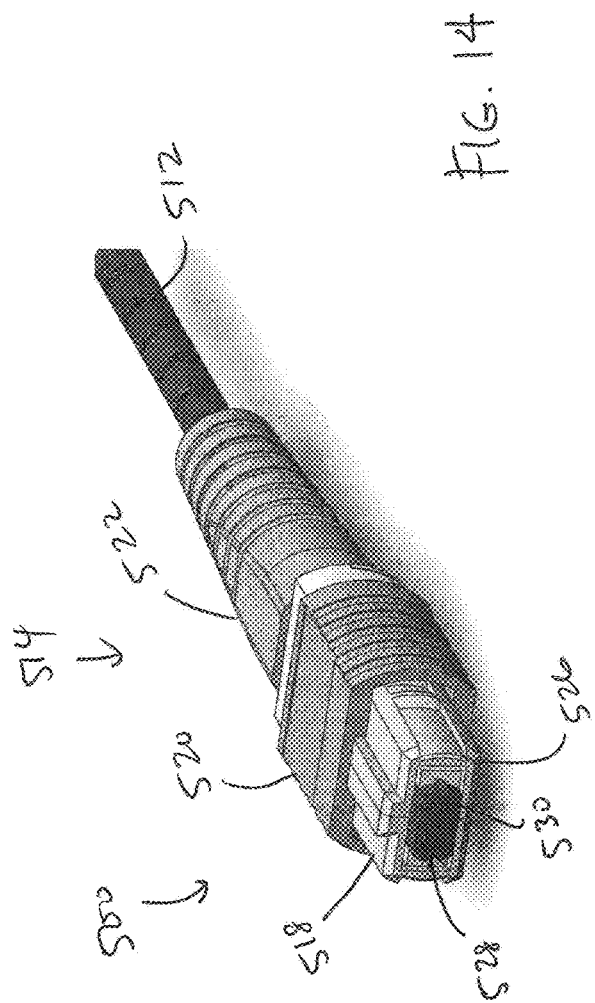
FIG. 14 is a perspective view of another exemplary fiber optic connector in accordance with various aspects of the disclosure.

The retention body 538 is inserted into the housing 518 when the connector 500 is assembled, and the protrusions 551 of the latching arms 550 engage openings 552 in the side wall of the housing 518. The spring 536 is compressed by this point and exerts a biasing force on the ferrule 516 via the ferrule adapter 534. The ferrule adapter 534 includes a flange configured to interact with a shoulder or stop formed within the housing 518 to retain the ferrule 516 and the ferrule adapter 534 within the housing 518. The boot 522 covers a rear portion of the retention body 538, as shown in FIGS. 14 and 15, and provides strain relief for the optical fibers 502 by limiting the extent to which the connector 500 can bend relative to the cable 512.

To insert the connector into an adapter or receptacle, the connector 500 is configured such that a user grasps the boot 522 and pushes the connector 500 into the adapter or receptacle. Pins from a mating connector (not shown) at the adapter or receptacle are received in the bores delineated by cooperative alignment of the channels 537 of the ferrule adapter 534 and the external channels 517, thereby allowing the housing to be fully inserted for proper engagement/mating with the adapter or receptacle. To disengage the connector 500 from an adapter or receptacle, the user grasps and pulls the slider 520, which may be biased by springs 556 relative to the housing 518, away from the adapter or receptacle. This way pull forces are transferred directly to the housing 518 (rather than the cable 512) to disengage the housing 518 from the adapter or receptacle.

FIG. 18 illustrates a ferrule assembly 510 configured to be pushed through a duct, for example a duct having an inner diameter less than 10 mm and, in some cases, a duct having an inner diameter of 5.5 mm. The ferrule assembly 510 includes the ferrule 516 terminating the plurality of fibers 502, the spring 536, and the crimp sleeve 540. As shown, the inner support sleeve 504 may be disposed beneath the jacket of the cable 512.

Referring now to FIG. 17, after the ferrule assembly 510 is pushed through a duct to a connection location of a fiber distribution system, the boot 522 can be moved over the ferrule assembly 510 and beyond the crimp sleeve 540. The ferrule adapter 534 can be positioned about the fibers 502 at the rearward end of the ferrule 516, as best shown in FIGS. 15 and 16. Then, the retention body halves 538a, 538b can be coupled together (e.g., snap-fit together) over the crimp sleeve 540 and spring 536, and the boot 522 can be moved forwardly over the rear portion of the retention body 538. The housing 518 is coupled with the retention body 538 via the cooperating protrusions 551 of the latching arms 550 and the openings 552 in the side walls of the housing 518. The shell springs 556 and shell 520 can then be coupled with the housing 518. The shell 520 may include a recessed portion 521 at a bottom inner surface and/or a top inner surface having a forward facing shoulder configured to engage a rearward facing shoulder of a projection 519 extending from a bottom outer surface and/or a top outer surface of the housing 518

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A fiber optic connector comprising:
a ferrule portion configured to terminate a plurality of fibers of a fiber optic cable;
an adapter portion structurally configured to receive the ferrule portion;
a body portion structurally configured to be coupled with a multi-fiber cable;
a biasing portion configured to urge the adapter portion toward a rearward facing surface of the ferrule portion;
a retaining portion disposed between the biasing portion and the adapter portion;
a housing portion structurally configured to be coupled with the body portion;
wherein the adapter portion is configured to be inserted into a rearward end of the housing portion between the ferrule portion and the biasing portion;
wherein the adapter portion and the ferrule portion are configured to move axially relative to the housing portion and the body portion against an urging force of the biasing portion;
wherein the adapter portion and the ferrule portion are configured to cooperate to define a ferrule interface configured to mate with a ferrule of a multi-fiber push on (MPO) connector;
wherein the ferrule portion is configured to include external channels at opposing lateral sides of the ferrule;
wherein the adapter portion is configured to include channels that oppose the external channels of the ferrule;
wherein the retaining portion is structurally configured to retain a pair of pins;
wherein the channels of the adapter portion and the external channels of the ferrule portion are configured to cooperate to define a pair of bores configured to receive the pair of pins;
wherein the biasing portion is configured to urge the retaining portion toward the adapter portion;
wherein the bores are configured to receive a pair of pins from a mating MPO connector;
wherein the ferrule portion is configured with a cross-sectional profile that is smaller than a ferrule of an MPO connector such that the ferrule portion is configured to be pushed through a duct having an inside diameter smaller than a cross-sectional profile of a ferrule of an MPO connector;
wherein the adapter portion is configured with a cross-sectional profile that is larger than a cross-sectional profile of the ferrule such that the adapter portion is prevented from being pushed through the duct coupled with the ferrule portion; and
wherein the adapter portion is configured to be coupled with the ferrule portion after the ferrule portion and the terminated plurality of fibers are pushed through the duct so as to provide a field-assembled MPO connector.

2. The fiber optic connector of claim 1, further comprising a shell portion structurally configured to be coupled with the housing portion.

3. The fiber optic connector of claim 2, wherein the shell portion is configured to house a pair of biasing members bearing against a forward facing surface of the housing portion and a rearward facing surface of the shell portion to urge the shell portion in the forward direction.

4. The fiber optic connector of claim 3, wherein the connector is configured to be disconnected from a mating adapter by urging the shell portion in a rearward direction against a biasing force of the pair of biasing members, thereby transferring such urging force to the housing portion rather than the cable.

5. The fiber optic connector of claim 1, wherein the body portion includes two retention body halves configured to be coupled with one another.

6. The fiber optic connector of claim 5, wherein the two retention body halves are configured to be coupled with the terminated plurality of fibers after the ferrule portion and the terminated plurality of fibers are pushed through the duct.

7. The fiber optic connector of claim 1, wherein the adapter portion and the housing portion are configured to limit a range of axial movement of the ferrule portion relative to the body portion.

8. The fiber optic connector of claim 1, wherein the biasing portion comprises a coil spring configured to extend about the fibers of the multi-fiber cable.

9. The fiber optic connector of claim 1, wherein the biasing portion is configured to be compressed between a forward facing surface of the body portion and a rearward facing surface of the adapter portion.

10. The fiber optic connector of claim 1, wherein the body portion is configured to be coupled with the multi-fiber cable via a crimp portion configured to be crimped onto the multi-fiber cable.

11. A fiber optic connector comprising:
a ferrule portion configured to terminate a plurality of fibers of a fiber optic cable;
an adapter portion structurally configured to receive the ferrule portion;
a body portion structurally configured to be coupled with a multi-fiber cable;
a biasing portion configured to urge the adapter portion toward a rearward facing surface of the ferrule portion;
a housing portion structurally configured to be coupled with the body portion;
wherein the adapter portion is configured to be inserted into a rearward end of the housing portion between the ferrule portion and the biasing portion;
wherein the adapter portion and the ferrule portion are configured to move axially relative to the housing portion and the body portion against an urging force of the biasing portion;
wherein the adapter portion and the ferrule portion are configured to cooperate to define a ferrule interface configured to mate with a ferrule of a multi-fiber push on (MPO) connector;
wherein the ferrule portion is configured to include external channels at opposing lateral sides of the ferrule;
wherein the adapter portion is configured to include channels that oppose the external channels of the ferrule;
wherein the channels of the adapter portion and the external channels of the ferrule portion are configured to cooperate to define a pair of bores configured to receive the pair of pins;
wherein the ferrule portion is configured with a cross-sectional profile that is smaller than a ferrule of an MPO connector such that the ferrule portion is configured to be pushed through a duct having an inside diameter smaller than a cross-sectional profile of a ferrule of an MPO connector;
wherein the adapter portion is configured with a cross-sectional profile that is larger than a cross-sectional profile of the ferrule such that the adapter portion is prevented from being pushed through the duct coupled with the ferrule portion; and
wherein the adapter portion is configured to be coupled with the ferrule portion after the ferrule portion and the terminated plurality of fibers are pushed through the duct so as to provide a field-assembled MPO connector.

12. The fiber optic connector of claim 11, further comprising a retaining portion disposed between the biasing portion and the adapter portion and structurally configured to retain the pair of pins.

13. The fiber optic connector of claim 12, wherein the biasing portion is configured to urge the retaining portion toward the adapter portion.

14. The fiber optic connector of claim 11, further comprising a shell portion structurally configured to be coupled with the housing portion.

15. The fiber optic connector of claim 14, wherein the shell portion is configured to house a pair of biasing members bearing against a forward facing surface of the housing portion and a rearward facing surface of the shell portion to urge the shell portion in the forward direction.

16. The fiber optic connector of claim 15, wherein the connector is configured to be disconnected from a mating adapter by urging the shell portion in a rearward direction against a biasing force of the pair of biasing members, thereby transferring such urging force to the housing portion rather than the cable.

17. The fiber optic connector of claim 11, wherein the body portion includes two retention body halves configured to be coupled with one another.

18. The fiber optic connector of claim 17, wherein the two retention body halves are configured to be coupled with the terminated plurality of fibers after the ferrule portion and the terminated plurality of fibers are pushed through the duct.

19. The fiber optic connector of claim 11, wherein the adapter portion and the housing portion are configured to limit a range of axial movement of the ferrule portion relative to the body portion.

20. The fiber optic connector of claim 11, wherein the biasing portion comprises a coil spring configured to extend about the fibers of the multi-fiber cable.

21. The fiber optic connector of claim 11, wherein the biasing portion is configured to be compressed between a forward facing surface of the body portion and a rearward facing surface of the adapter portion.

22. The fiber optic connector of claim 11, wherein the body portion is configured to be coupled with the multi-fiber cable via a crimp portion configured to be crimped onto the multi-fiber cable.

23. The fiber optic connector of claim 11, wherein the bores are configured to receive a pair of pins from a mating MPO connector.

24. The fiber optic connector of claim 11, wherein the biasing portion is configured to engage a rearward facing surface of the adapter portion.

25. A fiber optic connector comprising:
a ferrule portion configured to terminate a plurality of fibers of a fiber optic cable;
an adapter portion structurally configured to receive the ferrule portion;
a body portion structurally configured to be coupled with a multi-fiber cable;
a biasing portion configured to urge the adapter portion toward a rearward facing surface of the ferrule portion;
wherein the adapter portion is configured to be disposed between the ferrule portion and the biasing portion
wherein the adapter portion and the ferrule portion are configured to move axially relative to the body portion against an urging force of the biasing portion;
wherein the adapter portion and the ferrule portion are configured to cooperate to define a ferrule interface configured to mate with a ferrule of a multi-fiber push on (MPO) connector;
wherein the ferrule portion is configured to include external channels at opposing lateral sides of the ferrule;
wherein the adapter portion is configured to include channels that oppose the external channels of the ferrule;
wherein the channels of the adapter portion and the external channels of the ferrule portion are configured to cooperate to define a pair of bores configured to receive a pair of pins;
wherein the ferrule portion is configured with a cross-sectional profile that is smaller than a ferrule of an MPO connector such that the ferrule portion is configured to be pushed through a duct having an inside diameter smaller than a cross-sectional profile of a ferrule of an MPO connector;
wherein the adapter portion is configured with a cross-sectional profile that is larger than a cross-sectional profile of the ferrule such that the adapter portion is prevented from being pushed through the duct coupled with the ferrule portion; and wherein the adapter portion is configured to be coupled with the ferrule portion after the ferrule portion and the terminated plurality of fibers are pushed through the duct so as to provide a field-assembled MPO connector.

26. The fiber optic connector of claim 25, further comprising a retaining portion disposed between the biasing portion and the adapter portion and structurally configured to retain the pair of pins.

27. The fiber optic connector of claim 26, wherein the biasing portion is configured to urge the retaining portion toward the adapter portion.

28. The fiber optic connector of claim 25, further comprising a housing portion structurally configured to be coupled with the body portion.

29. The fiber optic connector of claim 28, wherein the adapter portion is configured to be inserted into a rearward end of the housing portion between the ferrule portion and the biasing portion.

30. The fiber optic connector of claim 28, wherein the adapter portion and the ferrule portion are configured to move axially relative to the housing portion and the body portion against an urging force of the biasing portion.

31. The fiber optic connector of claim 28, further comprising a shell portion structurally configured to be coupled with the housing portion.

32. The fiber optic connector of claim 31, wherein the shell portion is configured to house a pair of biasing members bearing against a forward facing surface of the housing portion and a rearward facing surface of the shell portion to urge the shell portion in the forward direction.

33. The fiber optic connector of claim 32, wherein the connector is configured to be disconnected from a mating adapter by urging the shell portion in a rearward direction against a biasing force of the pair of biasing members, thereby transferring such urging force to the housing portion rather than the cable.

34. The fiber optic connector of claim 25, wherein the body portion includes two retention body halves configured to be coupled with one another.

35. The fiber optic connector of claim 34, wherein the two retention body halves are configured to be coupled with the terminated plurality of fibers after the ferrule portion and the terminated plurality of fibers are pushed through the duct.

36. The fiber optic connector of claim 25, wherein the adapter portion and the housing portion are configured to limit a range of axial movement of the ferrule portion relative to the body portion.

37. The fiber optic connector of claim 25, wherein the biasing portion comprises a coil spring configured to extend about the fibers of the multi-fiber cable.

38. The fiber optic connector of claim 25, wherein the biasing portion is configured to be compressed between a forward facing surface of the body portion and a rearward facing surface of the adapter portion.

39. The fiber optic connector of claim 25, wherein the body portion is configured to be coupled with the multi-fiber cable via a crimp portion configured to be crimped onto the multi-fiber cable.

40. The fiber optic connector of claim 25, wherein the bores are configured to receive a pair of pins from a mating MPO connector.

41. The fiber optic connector of claim 25, wherein the biasing portion is configured to engage a rearward facing surface of the adapter portion.

* * * * *